(12) United States Patent
Bruflodt et al.

(10) Patent No.: US 12,516,506 B2
(45) Date of Patent: Jan. 6, 2026

(54) WORK VEHICLE HAVING CONTROLLED TRANSITIONS BETWEEN DIFFERENT DISPLAY MODES FOR A MOVEABLE AREA OF INTEREST

(71) Applicant: Deere & Company, Moline, IL (US)

(72) Inventors: Rachel Bruflodt, Dubuque, IA (US); Giovanni A. Wuisan, Epworth, IA (US); Brett S. Graham, Dubuque, IA (US)

(73) Assignee: Deere & Company, Moline, IL (US)

( * ) Notice: Subject to any disclaimer, the term of this patent is extended or adjusted under 35 U.S.C. 154(b) by 364 days.

(21) Appl. No.: 17/725,762

(22) Filed: Apr. 21, 2022

(65) Prior Publication Data
US 2023/0340759 A1    Oct. 26, 2023

(51) Int. Cl.
| | |
|---|---|
| *E02F 9/26* | (2006.01) |
| *E02F 9/20* | (2006.01) |
| *G05D 1/00* | (2024.01) |
| *G06T 3/40* | (2024.01) |
| *G06T 7/70* | (2017.01) |
| *H04N 23/53* | (2023.01) |
| *H04N 23/69* | (2023.01) |

(52) U.S. Cl.
CPC .............. *E02F 9/262* (2013.01); *E02F 9/205* (2013.01); *E02F 9/265* (2013.01); *G05D 1/0038* (2013.01); *G05D 1/0061* (2013.01); *G06T 3/40* (2013.01); *G06T 7/70* (2017.01); *H04N 23/531* (2023.01); *H04N 23/69* (2023.01); *G06T 2207/20132* (2013.01); *G06T 2207/30244* (2013.01); *G06T 2207/30252* (2013.01)

(58) Field of Classification Search
None
See application file for complete search history.

(56) References Cited

U.S. PATENT DOCUMENTS

| | | |
|---|---|---|
| 9,871,968 B2 | 1/2018 | Husted et al. |
| 10,086,761 B2 | 10/2018 | Krii et al. |
| 10,144,353 B2 | 12/2018 | Karner et al. |
| 10,293,752 B2 | 5/2019 | Yamashita et al. |
| 10,377,311 B2 | 8/2019 | Krii et al. |
| 10,378,162 B2 | 8/2019 | Krii et al. |
| 10,458,098 B2 | 10/2019 | Baeumchen |

(Continued)

*Primary Examiner* — Angela Y Ortiz
*Assistant Examiner* — Torrence S Marunda, II
(74) *Attorney, Agent, or Firm* — Gary L. Montle; Lucian Wayne Beavers; Patterson Intellectual Property Law, PC

(57) ABSTRACT

A work vehicle is configured for visually representing an area of interest such as the blade of a work implement. A first portion (e.g., frame) includes an operator cab and a second portion (e.g., boom assembly) is moveable relative to the first portion, wherein the area of interest is at least partially obscured from operator view during movement of the second portion. An imaging device is mounted on the second portion and has a field of view including the area of interest throughout the movement of the second portion. During a first operating mode, a display unit is caused to statically display an area around the area of interest while the area of interest moves along with movement of the second portion. During a second operating mode, the display unit is caused to statically display the area of interest while the background moves along with movement of the second portion.

18 Claims, 6 Drawing Sheets

(56) References Cited

U.S. PATENT DOCUMENTS

| | | | |
|---|---|---|---|
| 10,519,631 B2* | 12/2019 | Forcash | G05D 1/0246 |
| 10,844,579 B2 | 11/2020 | Shin et al. | |
| 10,907,326 B2 | 2/2021 | Olsen et al. | |
| 11,155,210 B2 | 10/2021 | Karner et al. | |
| 11,680,387 B1 | 6/2023 | Graham et al. | |
| 11,898,331 B2* | 2/2024 | Maley | E02F 9/2033 |
| 12,077,948 B2 | 9/2024 | Wuisan et al. | |
| 12,209,389 B2 | 1/2025 | Wuisan et al. | |
| 2008/0309784 A1 | 12/2008 | Asari et al. | |
| 2009/0022423 A1 | 1/2009 | Ehlgen et al. | |
| 2012/0127310 A1 | 5/2012 | Kim | |
| 2014/0204215 A1 | 7/2014 | Kriel et al. | |
| 2014/0247352 A1 | 9/2014 | Rathi et al. | |
| 2014/0267731 A1 | 9/2014 | Izumikawa | |
| 2015/0009329 A1 | 1/2015 | Ishimoto | |
| 2016/0138248 A1 | 5/2016 | Conway et al. | |
| 2016/0138249 A1* | 5/2016 | Conway | G06T 11/00 701/50 |
| 2017/0070498 A1 | 3/2017 | Fork et al. | |
| 2019/0078292 A1 | 3/2019 | Ono | |
| 2020/0407949 A1* | 12/2020 | Aizawa | E02F 9/24 |
| 2021/0206330 A1 | 7/2021 | Lee et al. | |
| 2023/0339402 A1 | 10/2023 | Graham et al. | |

* cited by examiner

WORK VEHICLE HAVING CONTROLLED TRANSITIONS BETWEEN DIFFERENT DISPLAY MODES FOR A MOVEABLE AREA OF INTEREST

FIELD OF THE DISCLOSURE

The present disclosure relates to work vehicles configured to provide improved operational awareness for human operators thereof. More particularly, the present disclosure relates to systems and methods for automatically maintaining a field of view including an area of interest relative to the work vehicle regardless of the position of a moveable implement or other vehicle portion relative to a main frame of the work vehicle, and further transitioning between different display operating modes based on a particular location of the implement or other vehicle portion along its trajectory of movement.

BACKGROUND

Work vehicles as discussed herein relate primarily to skid steer loaders and compact track loaders for reasons as further described below, but may in various embodiments apply as well to other work vehicles having boom assemblies or an equivalent thereof which are moved during operation to modify the terrain or equivalent working environment in some way, and more particularly which at least partially obscure a field of view for an operator during said movements.

There is an ongoing need in the field of such work vehicles for solutions that provide better operational awareness for the operator. One problem for the operator is that even in ideal circumstances the surroundings of the work vehicle can only be seen to a limited extent from the operator cab, and at various times throughout a trajectory of movement for a portion of the work vehicle such as for example a pivoting, telescoping, or articulating work implement (e.g., boom assembly) the operator's field of view of the terrain being worked the work implement (e.g., by a blade/bucket at a distal end of the boom assembly) may be almost entirely obscured. While this may not be problematic for certain work vehicles, skid steer loaders and compact track loaders are primary examples of a work vehicle wherein at least part of the boom assembly traverses what otherwise would be the field of view for an operator with respect to the working tool (blade) at or near a ground-engaging position, and wherein the field of view for an operator is further inherently obscured when the working tool (e.g., dump bucket) is at a highest elevated position, such as for example to dump a load into a bin which is taller than the work vehicle itself. Consequently, the operator may further be unable to sufficiently identify the relevant contours for external objects from a typical working position that are concealed by the work implement or otherwise unavailable in his field of vision.

BRIEF SUMMARY OF THE DISCLOSURE

The current disclosure provides an enhancement to conventional systems, at least in part by mounting a detection system (i.e., including one or more imaging devices such as cameras, lidar sensors, and the like) to a portion (e.g., boom assembly) of the work vehicle that is moveable relative to the frame thereof, and further processing the image data therefrom in such a manner that an area of interest (e.g., associated with a working tool) is maintained throughout a trajectory of movement for the boom assembly. In addition, various operating modes may be available, and transitioned between depending on conditions, wherein the area of interest may move relative to a fixed reference in at least one mode and the area of interest may be fixed relative to a moving background reference in at least one other mode.

According to a first embodiment, a method is disclosed herein for visually representing an area of interest associated with a work vehicle, wherein the work vehicle comprises: a first portion comprising a frame supported by a plurality of ground engaging units and an operator cab; a second portion moveable relative to the first portion, wherein an area of interest associated with the second portion is obscured from view from within the operator cab during at least part of a trajectory of movement of the second portion; and an imaging device mounted on the second portion of the work vehicle to move relative to the frame and to the terrain along with the trajectory of movement of the second portion of the work vehicle and having a field of view including the first area of interest throughout the at least first part of the trajectory of movement of the second portion of the work vehicle. The method includes steps of: processing input data from the imaging device to generate output signals corresponding to a representative display of the area of interest to a display unit, based upon a selected operating mode; wherein during a first operating mode, a specified focus comprises at least one further area within the field of view (e.g., background) with respect to the area of interest associated with the second portion and image display parameters associated with the specified focus are substantially maintained while the area of interest associated with the second portion moves relative thereto; and wherein during a second operating mode, the specified focus comprises the area of interest associated with the second portion, and image display parameters associated with the area of interest associated with the second portion are substantially maintained relative to movement of the at least one further area within the field of view in the display with movement of the second portion.

In a second embodiment, exemplary further aspects in accordance with the above-referenced first embodiment may include that the first operating mode or the second operating mode is automatically selected in accordance with a detected position of the second portion along the trajectory of movement therefor.

In a third embodiment, exemplary further aspects in accordance with the above-referenced second embodiment may include that a transition from the first operating mode to the second operating mode is automatically performed in accordance with a position of the area of interest associated with the second position relative to maintained contours corresponding to the at least one further area within the field of view.

In a fourth embodiment, exemplary further aspects in accordance with the above-referenced second embodiment may include that a transition between the first operating mode and the second operating mode is automatically performed based on the detected position of the second portion along the trajectory of movement compared with a threshold distance from a ground-engaging position for the area of interest associated with the second position.

In a fifth embodiment, exemplary further aspects in accordance with the above-referenced second embodiment may include that automatic selection of the operating mode is disabled and/or superseded via manual input commands via a user interface.

Exemplary further aspects in accordance with the above-referenced first to fifth embodiments may include that the second portion comprises a work implement supported by the frame and configured to selectively move a working tool at a distal end thereof between a ground-engaging position and a maximum elevated position at opposing ends of a trajectory of movement, the area of interest comprises the working tool, the first operating mode is active at least while the working tool is in the ground-engaging position, and the second operating mode is active at least while the working tool is in the maximum elevated position.

The work implement may for example comprise a boom assembly upon which the imaging device is mounted, wherein a center of the field of view of the imaging device is directed rearward of a normal axis passing through the imaging device relative to a terrain across which the work vehicle travels.

Exemplary further aspects in accordance with the above-referenced first to fifth embodiments may include that the imaging device comprises a zoom lens, the method further comprising automatically adjusting a zoom setting based at least in part on a current position of the imaging device along the trajectory of movement of the second portion of the work vehicle.

Exemplary further aspects in accordance with the above-referenced first to fifth embodiments may include that the imaging device is coupled to the second portion of the work vehicle via a rotatable mount, the method further comprising automatically adjusting rotation and accordingly an orientation of the imaging device based at least in part on a current position of the imaging device along the trajectory of movement of the second portion of the work vehicle.

Exemplary further aspects in accordance with the above-referenced first to fifth embodiments may include dynamically processing the input data based on a current position of the imaging device along the trajectory of movement of the second portion of the work vehicle. The dynamic processing of the input data may for example comprise dynamic cropping and resizing of the input data from the field of view of the imaging device and with respect to an area of interest comprising the specified focus. The current position of the imaging device may for example be determined in a local reference system via at least signals from one or more kinematic sensors. At least one of the one or more kinematic sensors may optionally be integrated in the imaging device.

Exemplary further aspects in accordance with the above-referenced first to fifth embodiments and optional aspects may include generating and iteratively training and updating a plurality of models corresponding to respective positions of the imaging device throughout the trajectory, wherein the dynamic processing of the input data comprising dynamic cropping and further geometric and spatial translation of the input data is performed via selection of an appropriate model based on the determined current position of the imaging device.

In a sixth exemplary embodiment, a work vehicle comprises: a first portion comprising a frame supported by a plurality of ground engaging units and an operator cab; a second portion moveable relative to the first portion, wherein an area of interest associated with the second portion is obscured from view from within the operator cab during at least part of a trajectory of movement of the second portion; an imaging device mounted on the second portion of the work vehicle to move relative to the frame and to the terrain along with the trajectory of movement of the second portion of the work vehicle and having a field of view including the area of interest throughout the at least part of the trajectory of movement of the second portion of the work vehicle; an onboard display unit viewable from within the operator cab; and a controller functionally linked to the imaging device to receive input data therefrom. The controller is further configured to direct the performance of steps in a method according to any of the above-referenced first to fifth embodiments and optional aspects.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
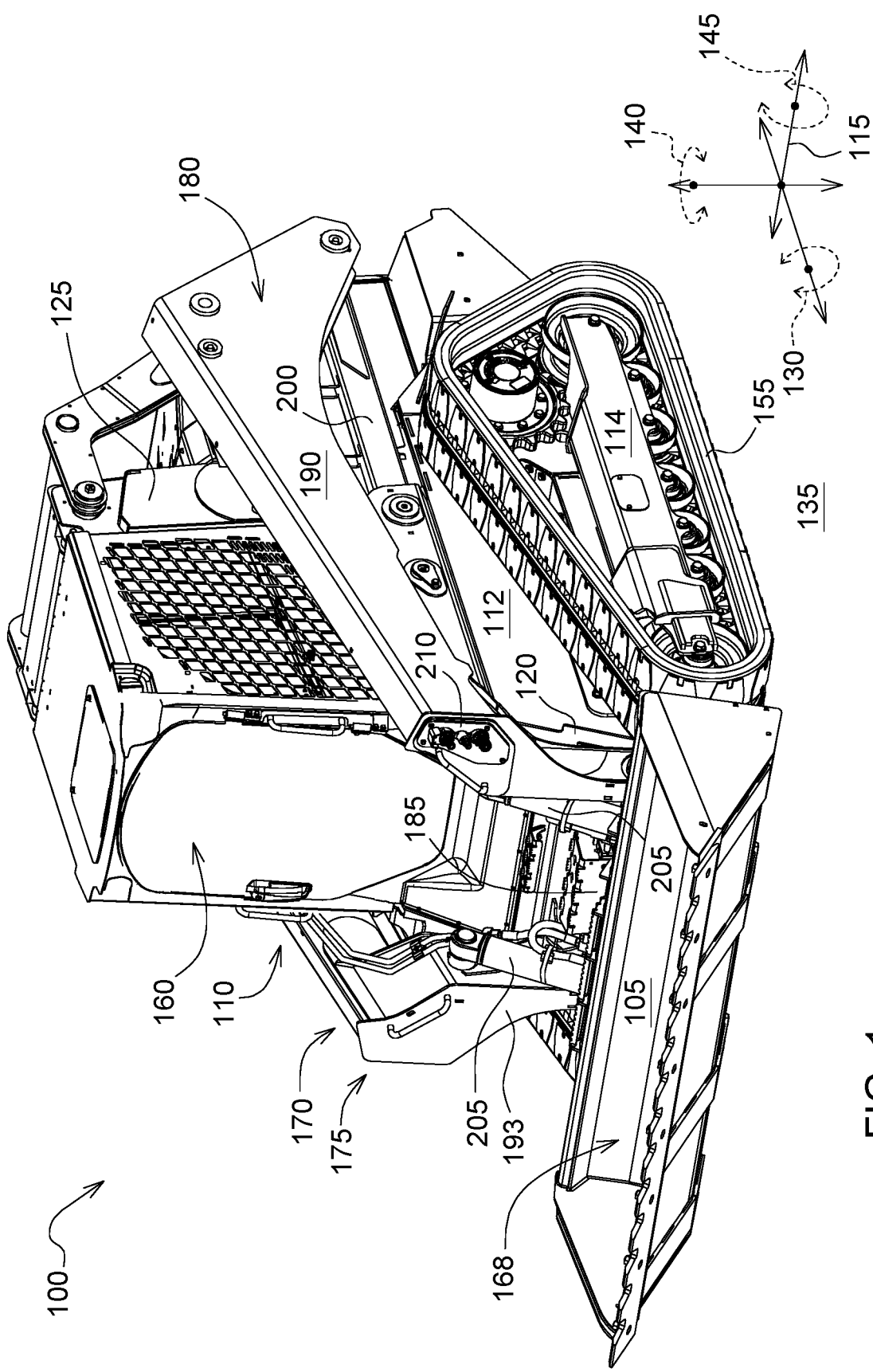
FIG. 1 is a perspective view of an embodiment of a skid-steer loader as a work vehicle according to the present disclosure.

Referring now to the drawings and particularly to FIG. 1, a representative work vehicle is shown and generally designated by the number 100. A work vehicle 100 may also be described herein as a "work machine" or "machine" without explicit limitation to the scope thereof, or otherwise implying a self-propelled or other such feature to the relevant structure. FIG. 1 shows a compact track loader, but it may be understood that the work vehicle 100 could be one of many types of work vehicles, including, and without limitation, a skid steer loader, a backhoe loader, a front loader, a bulldozer, and other construction vehicles, having distinctions in their respective components with respect to the compact track loader and as may be appreciate by one of skill in the art. The work vehicle 100, as shown, has a frame 110 extending in a fore-aft direction 115 with a front-end section 120 and a rear-end section 125. The work vehicle includes a ground-engaging mechanism 155 that supports the frame 110 and an operator cab 160 supported on the frame 110, wherein the ground-engaging mechanism 155 is configured to support the frame 110 on a surface 135.

An engine 165 (not shown) is coupled to the frame 110 and is operable to move the work vehicle 100. The illustrated work vehicle includes tracks, but other embodiments can include one or more wheels that engage the surface 135. The work vehicle 100 may be operated to engage the surface 135 and cut and move material to achieve simple or complex features on the surface. As used herein, directions with regard to work vehicle 100 may be referred to from the perspective of an operator seated within the operator cab 160; the left of work vehicle 100 is to the left of such an operator, the right of work vehicle is to the right of such an operator, the front or fore of work vehicle is the direction such an operator faces, the rear or aft of work vehicle is behind such an operator, the top of work vehicle is above such an operator, and the bottom of work vehicle below such an operator. In order to turn, the ground-engaging mechanism 155 on the left side of the work vehicle may be operated at a different speed, or in a different direction, from the ground-engaging mechanism 155 on the right side of the work vehicle 100. In a conventional compact track loader, the operator can manipulate controls from inside an operator cab 160 to drive the tracks on the right or left side of the work vehicle 100. Rotation for work vehicle may be referred to as roll 130 or the roll direction, pitch 145 or the pitch direction, and yaw 140 or the yaw direction.

The work vehicle 100 comprises a boom assembly 170 coupled to the frame 110. An attachment 105, or work tool, may be pivotally coupled at a forward portion 175 of the boom assembly 170, while a rear portion 180 of the boom assembly 170 is pivotally coupled to the frame 110. The frame 110 as represented comprises a main frame 112 and a track frame 114. The attachment 105 is illustrated as a bucket but may further or alternatively be any number of work tools such as a blade, forks, an auger, a drill, or a hammer, just to name a few possibilities. The attachment 105 may be coupled to the boom assembly 170 through an attachment coupler 185 which may be coupled to a distal section of the lift arms 190, or more specifically a portion of the boom arms in the forward portion 175 of the boom assembly 170.

The boom assembly 170 comprises a first pair of lift arms 190 pivotally coupled to the frame 110 (one each on a left side and a right side of the operator cab 160) and moveable relative to the frame 110 by a pair of first hydraulic cylinders 200, wherein the pair of first hydraulic cylinders 200 may also conventionally be referred to as a pair of lift cylinders (one coupled to each boom arm) for a compact track loader. The attachment coupler 185 may be coupled to a forward section 193 of the pair of lift arms 190, being moveable relative to the frame 110 by a pair of second hydraulic cylinders 205, which may be referred to as tilt cylinders for a compact track loader. The frame 110 of the work vehicle 100 further comprises a hydraulic coupler 210 on the front-end portion 120 of the work vehicle 100 to couple one or more auxiliary hydraulic cylinders (not shown) to drive movement of or actuate auxiliary functions of an attachment 105. The attachment coupler 185 enables the mechanical coupling of the attachment 105 to the frame 110. The hydraulic coupler 210, contrary to the attachment coupler 185, enables the hydraulic coupling of an auxiliary hydraulic cylinder(s) on the attachment 105 to the hydraulic (implement control) system 326 (see FIG. 3) of the work vehicle 100. It may be understood that not all attachments will have one or more auxiliary hydraulic cylinders and therefore may not use the hydraulic coupler 210. In the configuration represented in FIG. 1, wherein a bucket 168 is coupled to a compact track loader, the bucket does not use the hydraulic coupler or have auxiliary hydraulic cylinders. Alternatively, for example, the hydraulic coupler 210 may open or close a grapple type attachment or spin a roller brush type attachment.

Each of the pair of first hydraulic cylinders 200, the pair of second hydraulic cylinders 205, and any auxiliary cylinders if applicable when found on the attachment 105 may be double acting hydraulic cylinders. One end of each cylinder may be referred to as a head end, and the end of each cylinder opposite the head end may be referred to as a rod end. Each of the head end and the rod end may be fixedly coupled to another component, such as a pin-bushing or pin-bearing coupling, to name but two examples of pivotal connections. As a double acting hydraulic cylinder, each may exert a force in the extending or retracting direction. Directing pressurized hydraulic fluid into a head chamber of the cylinders will tend to exert a force in the extending direction, while directing pressurized hydraulic fluid into a rod chamber of the cylinders will tend to exert a force in the retracting direction. The head chamber and the rod chamber may both be located within a barrel of the hydraulic cylinder and may both be part of a larger cavity which is separated by a moveable piston connected to a rod of the hydraulic cylinder. The volumes of each of the head chamber and the rod chamber change with movement of the piston, while movement of the piston results in extension or retraction of the hydraulic cylinder.

For a work vehicle 100 as represented in FIG. 1, and further in view of the different potential positions of the boom assembly 170 and more particularly the lift arms 190 thereof throughout an available trajectory of movement, it may be understood that the boom assembly 170 at least partially obscures at least a lateral field of view from an operator when seated in the operator cab 160 during various portions of the available trajectory of movement.

Figure 2:
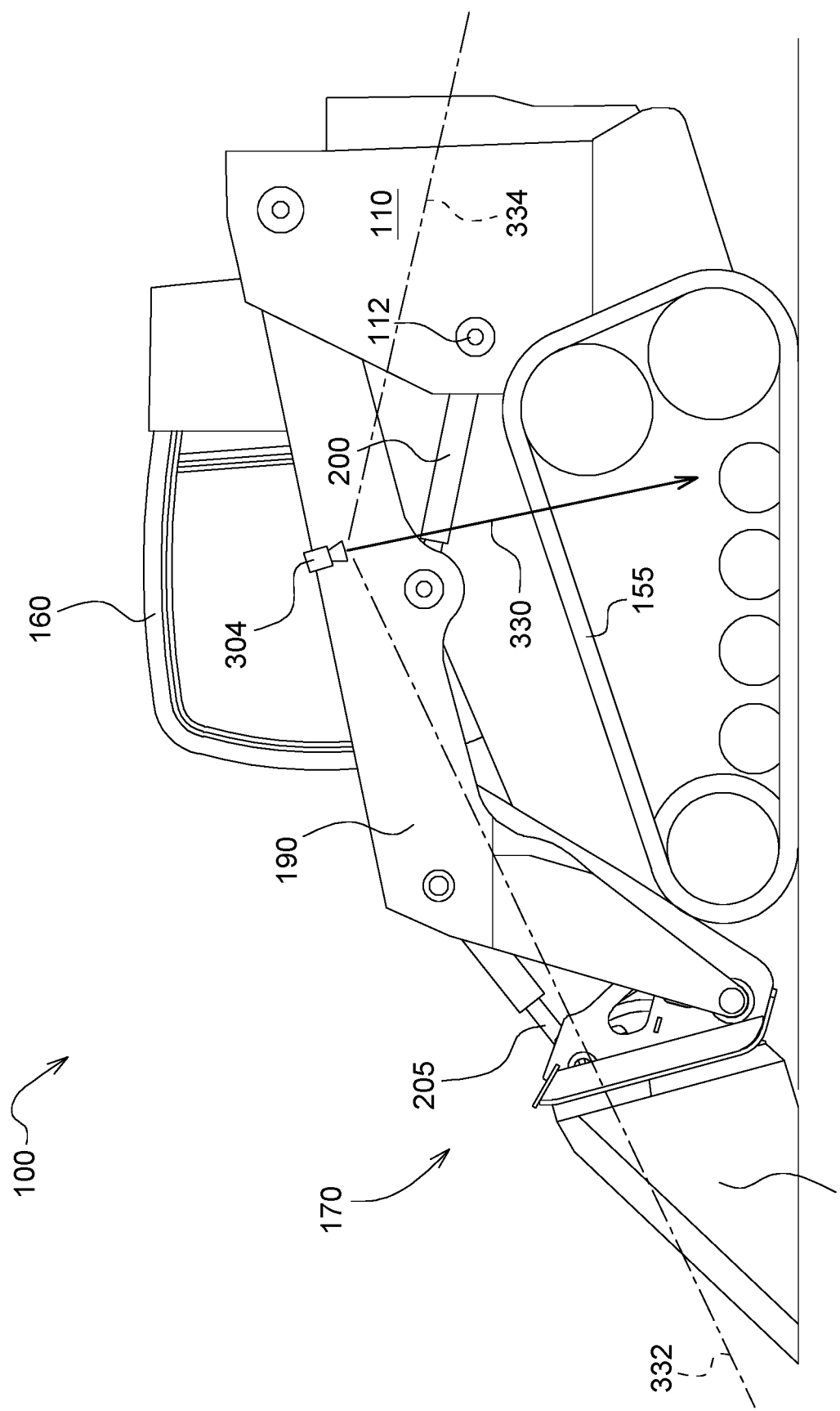
FIG. 2 is a side view representing an embodiment of the skid-steer loader having an imaging device mounted on the boom assembly.

In an embodiment as further represented in FIG. 2, an imaging device 304 is mounted to the boom assembly 170 of the work vehicle rather than the frame 110. The imaging device 304 as shown has a wide field of view 332, 334 which enables an area proximate the working tool 105 to fall within the field of view 332, 334 even though the imaging device 304 is mounted such that a center 330 of the field of view 332, 334 is directly slightly rearward relative to a normal axis thereof (i.e., a z-axis corresponding to gravity), at least while the boom assembly 170 and the working tool 105 is in a ground-engaging position as shown.

Where the work vehicle 100 is a skid steer or compact track loader as shown, a first portion of the work vehicle 100 may be defined as including the frame 110 whereas a second portion of the work vehicle includes at least the boom assembly 170 which is supported from and moveable relative to the frame 110. In various alternative embodiments as previously noted (not shown in the figures), the work vehicle 100 may be an excavator, a crawler dozer, an articulated dump truck, or the like. In the case of an excavator, for example, the first portion of the work vehicle 100 includes the frame supporting the operator cab 160 while the second portion includes the boom assembly 170 supported by the frame 110 but forwardly and centrally extending, such that the boom assembly 170 obscures visibility from a different perspective than with the compact track loader, for example. As another non-limiting example, the imaging device may for example be mounted on either portion of an articulating vehicle such as a dump truck.

Figure 3:
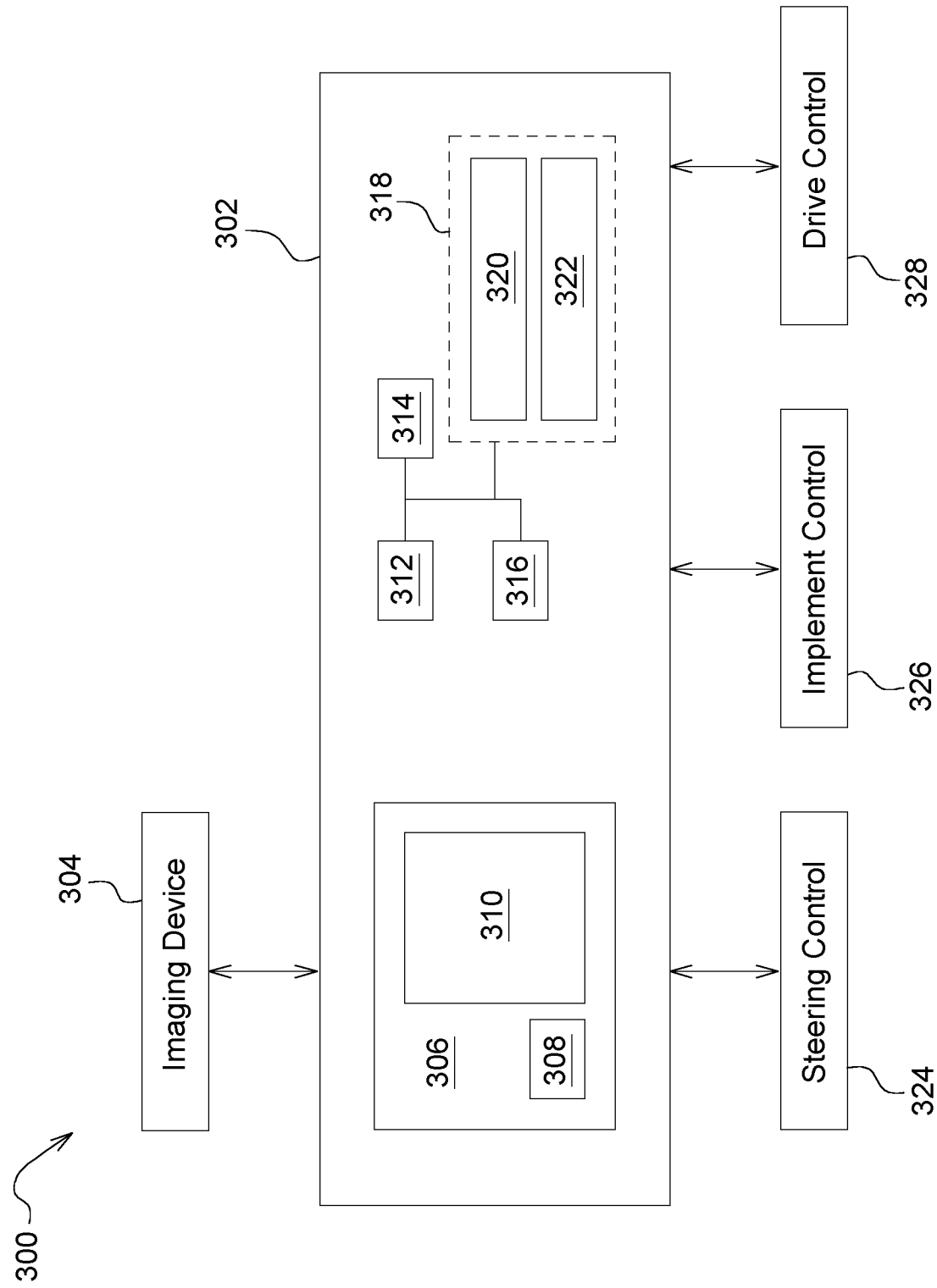
FIG. 3 is a graphical diagram representing an exemplary control system for a work vehicle of the present disclosure.

As schematically illustrated in FIG. 3, the work vehicle 100 includes a control system 300 including a controller 302. The controller 302 may be part of the vehicle control unit, or it may be a separate control module. The controller 302 may include the user interface 306 and optionally be mounted in the operators cab 160 at a control panel.

The controller 302 is configured to receive input signals from the imaging device 304. The output signals from the imaging device 304 may be provided directly to the controller 302 or for example via intervening components for analog-to-digital conversion and/or video interface (not shown). Certain additional sensors (not shown) may be functionally linked to the controller 302 and provided to detect vehicle operating conditions and/or kinematics. In an embodiment, at least one kinematics sensor such as a rotary sensor may be provided for tracking a position of the imaging device 304 relative to a predetermined area of interest.

In a particular exemplary embodiment, vehicle kinematics sensors for tracking a position of the imaging device 304 relative to a predetermined area of interest may be provided in the form of inertial measurement units (each, an IMU) integrated within the imaging device 304 and/or separately mounted on at least the frame 110 of the work vehicle 100, and further on the lift arm 190 or other relevant component upon which the imaging device 304 is mounted. IMUs include a number of sensors including, but not limited to, accelerometers, which measure (among other things) velocity and acceleration, gyroscopes, which measure (among other things) angular velocity and angular acceleration, and magnetometers, which measure (among other things) strength and direction of a magnetic field. Generally, an accelerometer provides measurements, with respect to (among other things) force due to gravity, while a gyroscope provides measurements, with respect to (among other things) rigid body motion. The magnetometer provides measurements of the strength and the direction of the magnetic field, with respect to (among other things) known internal constants, or with respect to a known, accurately measured magnetic field. The magnetometer provides measurements of a magnetic field to yield information on positional, or angular, orientation of the IMU; similarly to that of the magnetometer, the gyroscope yields information on a positional, or angular, orientation of the IMU. Accordingly, the magnetometer may be used in lieu of the gyroscope, or in combination with the gyroscope, and complementary to the accelerometer, in order to produce local information and coordinates on the position, motion, and orientation of the IMU.

In another embodiment, non-kinematic sensors may be implemented for position detection, such as for example markers or other machine-readable components that are mounted or printed on the work vehicle 100 and within the field of view of the imaging device 304. In one example, April tags or an equivalent may be provided such that, depending on how the marker appears within the field of view of the imaging device 304, data processing elements may calculate a distance to the marker and/or orientation of the marker relative to the imaging device 304 for spatially ascertaining the position of the imaging device 304. As another example, machine learning techniques may be implemented based on inputs for two or more known components of the work vehicle 100 such as a front cab mount and a rear mudguard, such that the data processing units can spatially ascertain a position of the imaging device 304 based on a distance between the two or more components and their respective positions in the field of view of the imaging device 304.

Other sensors functionally linked to the controller 302 which may optionally be provided for functions as described herein or otherwise may include for example global positioning system (GPS) sensors, vehicle speed sensors, ultrasonic sensors, laser scanners, radar wave transmitters and receivers, thermal sensors, imaging devices, structured light sensors, and other optical sensors, and whereas one or more of these sensors may be discrete in nature a sensor system may further refer to signals provided from a central machine control unit.

The imaging device 304 may include video cameras configured to record an original image stream and transmit corresponding data to the controller 302. In the alternative or in addition, the imaging device 304 may include one or more of a digital (CCD/CMOS) camera, an infrared camera, a stereoscopic camera, a time-of-flight/depth sensing camera, high resolution light detection and ranging (LiDAR) scanners, radar detectors, laser scanners, and the like within the scope of the present disclosure. The number and orientation of said imaging devices 304 or respective sensors may vary in accordance with the type of work vehicle 100 and relevant applications, but may at least be provided with respect to a field of view 332, 334 alongside the work vehicle 100 and configured to capture data associated with lateral surroundings and associated objects proximate thereto. As described herein, a field of view 332, 334 of the imaging device 304 may be loosely characterized as having a forward boundary 332 and a rearward boundary 334 of relevance with respect to an area of interest which may be available for monitoring and display when located between said boundaries 332, 334 and accordingly within the field of view 332, 334. It may be understood that a field of view for the camera may have various different forms and accordingly different boundaries than the forward and rearward boundaries as described, but the discussion of these boundaries is intended as merely illustrative for the purposes of the accompanying functions for determining an area of interest relative thereto.

In an embodiment, the imaging device 304 may include an ultra-wide-angle lens (e.g., a "fish-eye" lens) having a sufficiently broad field of view to capture an area of interest at any position along an available trajectory of movement (if any) of a component upon which the imaging device 304 is mounted, and to provide image data comprising the area of interest projected on a plane for image data processing functions as further described elsewhere herein.

In an embodiment, the imaging device 304 may be provided with a zoom lens such that the field of view and correspondingly the output image data from the imaging device compensates for movement of the position of the imaging device relative to the area of interest. Such an embodiment may eliminate or at least reduce the need for data processing downstream of the imaging device to resize the field of view.

In another embodiment, it may be contemplated that a single imaging device 304 may be utilized but provided with a moveable/rotatable mount such that the field of view is dynamic to correspond with an area of interest throughout movement (if any) of the component upon which the imaging device is mounted. In yet another embodiment, a plurality of imaging devices may be provided such that selection of a given imaging device and its corresponding field of view may be implemented to optimize the image data for an area of interest.

It may of course be understood that one or more of the preceding embodiments with respect to the imaging device 304 may be combined to provide corresponding features for a method as described below. For example, a zoom lens may be provided along with a panning base such that the imaging device is continuously directed to the same area of interest throughout movement (if any) of the element of the work vehicle 100 to which the imaging device is mounted.

One of skill in the art may appreciate that image data processing functions may be performed discretely at a given imaging device 304 if properly configured, but most if not all image data processing may generally be performed by the controller 302 or other downstream data processor. For example, image data from either or both of the imaging devices 304*a*, 304*b* may be provided for three-dimensional point cloud generation, image segmentation, object delineation and classification, and the like, using image data processing tools as are known in the art in combination with the objectives disclosed.

The controller 302 of the work vehicle 100 may be configured to produce outputs, as further described below, to a user interface 306 associated with a display unit 310 for display to the human operator. The controller 302 may be configured to receive inputs from the user interface 306, such as user input provided via the user interface 306. Not specifically represented in FIG. 3, the controller 302 of the work vehicle 100 may in some embodiments further receive inputs from and generate outputs to remote devices associated with a user via a respective user interface, for example a display unit with touchscreen interface. Data transmission between for example the vehicle control system and a remote user interface may take the form of a wireless communications system and associated components as are conventionally known in the art. In certain embodiments, a remote user interface and vehicle control systems for respective work vehicles may be further coordinated or otherwise interact with a remote server or other computing device for the performance of operations in a system as disclosed herein.

The controller 302 may be configured to generate control signals for controlling the operation of respective actuators, or signals for indirect control via intermediate control units, associated with a machine steering control system 324, a machine implement control system 326, and/or a machine drive control system 328. The controller 302 may for example be electrically coupled to respective components of these and/or other systems by a wiring harness such that messages, commands, and electrical power may be transmitted between the controller 302 and the remainder of the work vehicle 100. The controller 302 may be coupled to other controllers, such as for example the engine control unit (ECU), through a controller area network (CAN), and may then send and receive messages over the CAN to communicate with other components of the CAN.

The controller 302 may include or be associated with a processor 312, a computer readable medium 314, a communication unit 316, data storage 318 such as for example a database network, and the aforementioned user interface 306 or control panel 306 having a display 310. An input/output device 308, such as a keyboard, joystick or other user interface tool, is provided so that the human operator may input instructions to the controller. It is understood that the controller described herein may be a single controller having all of the described functionality, or it may include multiple controllers wherein the described functionality is distributed among the multiple controllers.

Various operations, steps or algorithms as described in connection with the controller 302 can be embodied directly in hardware, in a computer program product such as a software module executed by the processor 312, or in a combination of the two. The computer program product can reside in RAM memory, flash memory, ROM memory, EPROM memory, EEPROM memory, registers, hard disk, a removable disk, or any other form of computer-readable medium 314 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" 312 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 316 may support or provide communications between the controller and external systems or devices, and/or support or provide communication interface with respect to internal components of the work vehicle. The communications unit may include wireless communication system components (e.g., via cellular modem, WiFi, Bluetooth or the like) and/or may include one or more wired communications terminals such as universal serial bus ports.

The data storage 318 in an embodiment may be configured to at least receive and store real-time and/or historical data sets regarding machine parameters 320 and real-time and/or historical data sets regarding image data parameters 322 in selectively retrievable form, for example as inputs for developing models as further described herein for correlating positions of the boom assembly 170 and/or the imaging device 304 relative to the frame 110 and/or the area of interest for display purposes. Data storage as discussed herein may, unless otherwise stated, generally encompass hardware such as volatile or non-volatile storage devices, drives, memory, or other storage media, as well as one or more databases residing thereon.

Figure 5A:
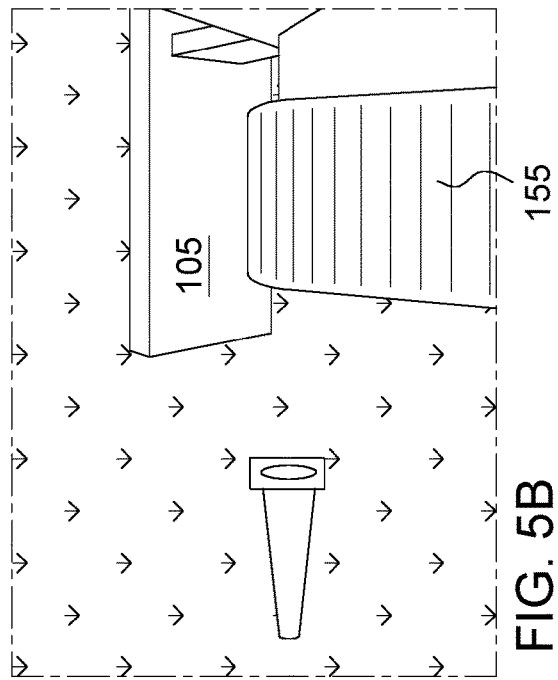
FIGS. 5A-5D are graphical diagrams representing a first display mode, wherein displayed images having the peripheral contours of a first area of interest comprising the proximate terrain are maintained while the boom assembly and imaging device are in movement, further demonstrating movement of the working tool relative to the maintained peripheral contours of the area of interest.
Figure 5B:
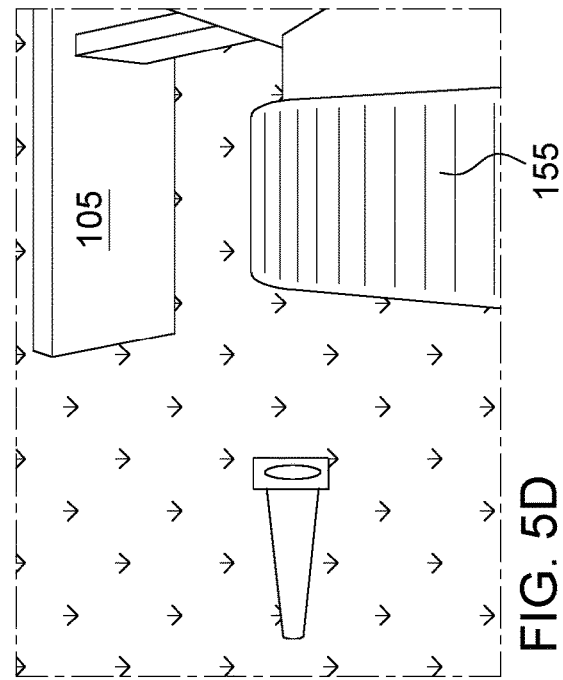
Figure 5C:
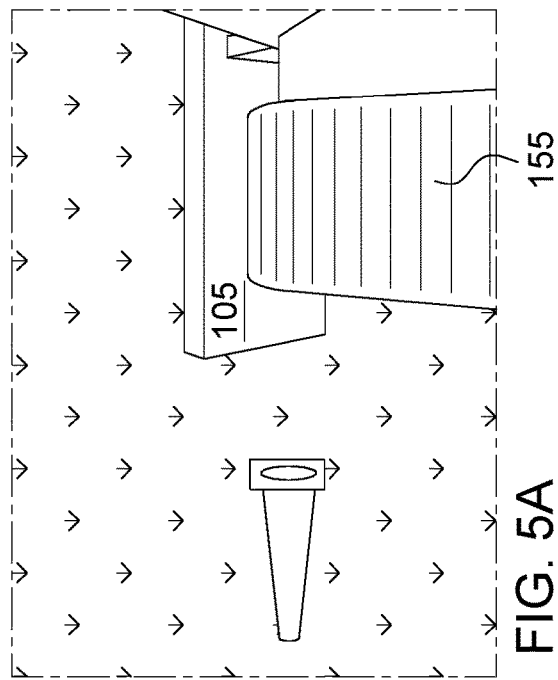
Figure 5D:
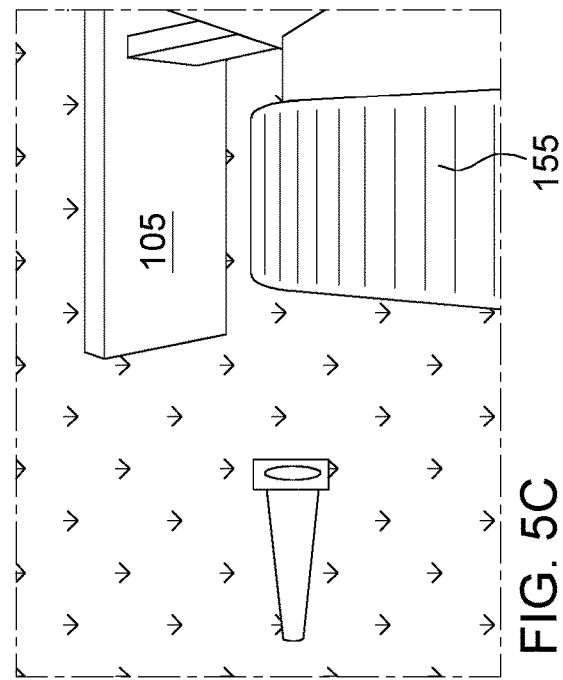

Referring now to FIGS. 1 and 5A to 5D, in an embodiment of a first operating mode as disclosed herein an imaging device 304 is mounted on the lift arm 190 of the boom assembly 170 of a work vehicle 100 such that at least a portion of a field of view (as represented in FIGS. 5A to 5D) for the imaging device 304 includes an area of interest (e.g., the working tool 105) throughout at least part of the available trajectory of movement for the boom assembly 170. As represented in FIG. 5A, the boom assembly 170 and accordingly the imaging device 304 are at a lowest available position, and the working tool (blade) is in a ground-engaging position. As represented in FIG. 5B, the boom assembly 170 and accordingly the imaging device 304 have been raised from the lowest available position along the available trajectory of movement, but the display of the background (i.e., a portion of the terrain proximate to the working tool) remains in substantially the same form even as the working tool moves relative thereto in the displayed image. As represented in FIGS. 5C and 5D, the boom assembly 170 and accordingly the imaging device 304 continue to be raised from the previously described positions along the available trajectory of movement as represented in FIGS. 5A and 5B, with the display of the background reference (portion of the terrain proximate to the working tool) continuing to remain in substantially the same form even as the working tool moves relative thereto in the displayed images.

Figure 6A:
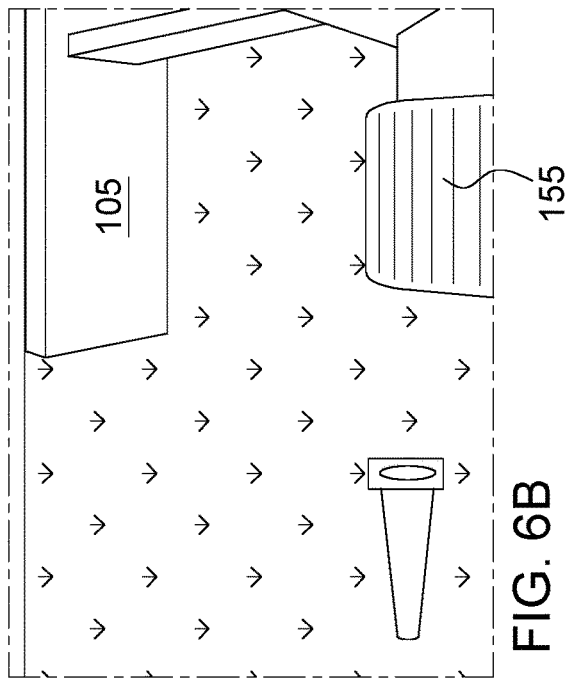
FIGS. 6A-6D are graphical diagrams representing a second display mode, wherein a position of the working tool is maintained in the displayed images and the surrounding terrain is shown as moving along with corresponding movement of the boom assembly and imaging device.
Figure 6B:
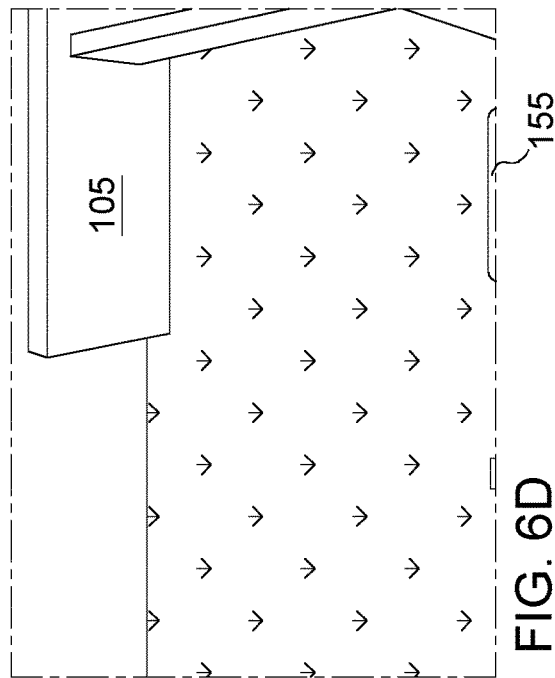
Figure 6C:
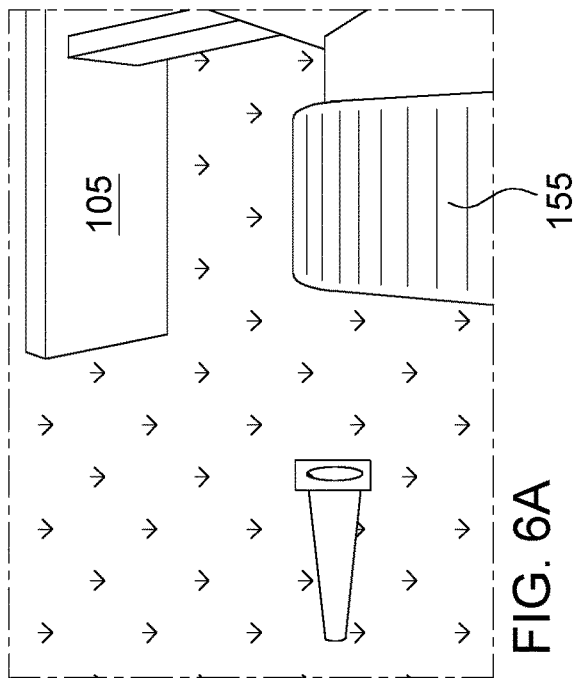
Figure 6D:
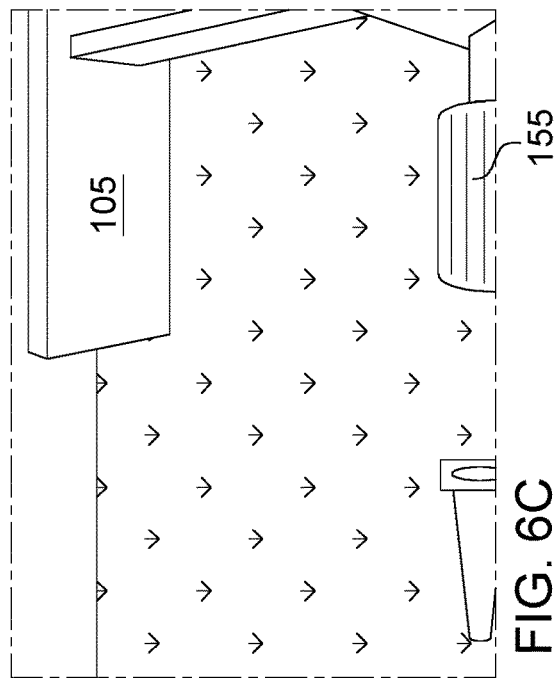

Referring next to FIGS. 1 and 6A to 6D, in an embodiment of a second operating mode as disclosed herein the same imaging device 304 is utilized but with the boom assembly 170 at higher positions relative to those of the first operating mode. In the example as described here, the boom assembly 170 and accordingly the working tool 105 may have started in the position represented in FIG. 5A and raised sequentially through FIGS. 5B to 5D, and then after a transition of operating modes as further described below continues with FIGS. 6A to 6D. As represented in FIG. 6A, the boom assembly 170 and accordingly the imaging device 304 are at a first position after the aforementioned transition. As represented in FIG. 6B, the boom assembly 170 and accordingly the imaging device 304 have been raised from the position in FIG. 6A along the available trajectory of movement, but the display of the working tool 105 remains in substantially the same form even as the reference background (i.e., portion of the terrain behind the working tool) moves relative thereto in the displayed image. As represented in FIGS. 6C and 6D, the boom assembly 170 and accordingly the imaging device 304 continue to be raised from the previously described positions along the available trajectory of movement as represented in FIGS. 6A and 6B, with the display of the working tool continuing to remain in substantially the same form even as the background reference (portion of the terrain behind the working tool) moves relative thereto in the displayed images.

As the lift arm 190 and the imaging device 304 are raised along the available trajectory of movement, these components do not merely elevate but also pivot in orientation relative to the ground surface 135. Accordingly, in various embodiments the imaging device 304 may be positioned and oriented so as to capture the area of interest (e.g., working tool 105) throughout the pivoting motion of the boom assembly 170, even if this means that the area of interest starts in one portion of the field of view 332, 334 and ends up in another portion of the field of view 332, 334. The type, configuration, and/or parameters of the imaging device 304 may need to be selected based on the type of work vehicle 100 and/or desired area of interest to have a sufficiently wide angle for its field of view, depending for example on the amount of available movement for the boom assembly 170.

It may be appreciated that the position and size of the field of view 332, 334 and associated viewing area recorded by a respective imaging device 304 may typically depend on the arrangement and orientation of an associated camera on the frame 110 or boom assembly 170 and further on the camera lens system, in particular the focal length of the lens of the camera. The positions and sizes of the viewing areas in FIGS. 2, 5A to 5D, and 6A to 6D should accordingly only be considered as exemplary, as they will vary for any number of parameters in a particular implementation.

Figure 4:
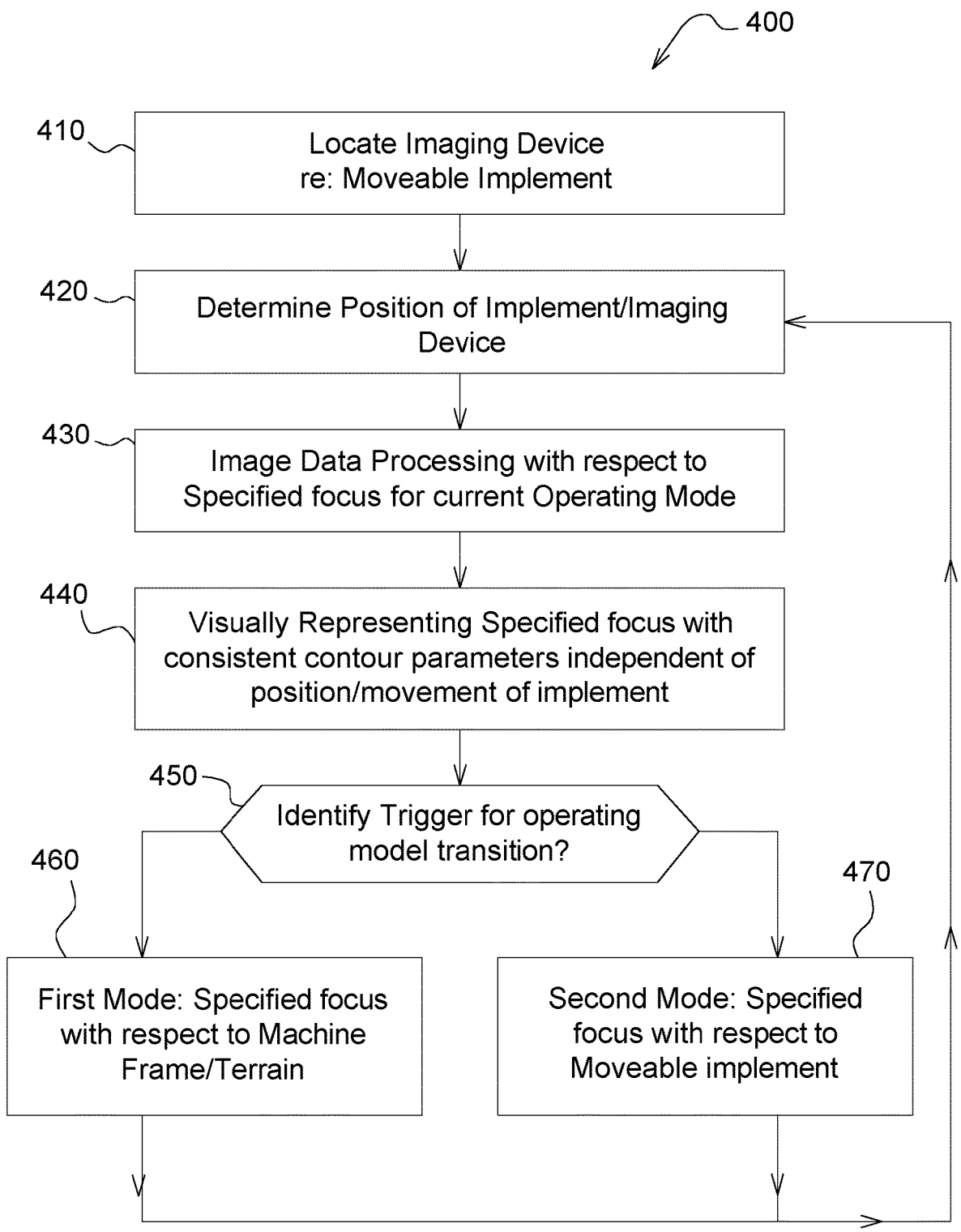
FIG. 4 is a flowchart representing an exemplary method according to the present disclosure.

Referring next to FIG. 4, an exemplary method 400 of visually representing an area of interest proximate to or otherwise associated with a work vehicle 100 may now be described, more particularly with respect to an embodiment as previously discussed wherein the imaging device 304 is mounted (step 410) on a second portion (e.g., boom assembly 170) relative to a first portion (e.g., frame 110) of such a work vehicle 100.

In various embodiments an area of interest may be predetermined, and further description herein will be provided for the example where the area of interest is a working tool 105 such as a blade/bucket at a distal end of the boom assembly 170. However, in other embodiments it may be contemplated that the area of interest is automatically selected or otherwise determined based on working conditions or available for selection via user input.

As noted elsewhere herein, various operating modes may be available and transitioned between depending on work vehicle conditions, wherein for example the area of interest may move relative to a fixed reference (first specified focus) in at least one mode (a "first operating mode" for the purposes of this discussion) and the area of interest may be fixed (second specified focus) relative to a moving background reference in at least one other mode (a "second operating mode" for the purposes of this discussion). Additional operating modes may be contemplated within the scope of the present disclosure.

In determining when to execute transitions between the operating modes and each respective specified focus, and also for the purpose of performing image processing, the method 400 may accordingly include a step 420 of determining a position of the boom assembly 170, working tool 105, and/or imaging device 304 relative to the frame 110 or other reference. For a given operating mode and for a position (or positions) as determined in step 420, the method 400 further includes a step 430 wherein input data from the imaging device 304 is processed to generate output signals corresponding to a representative display of the area of interest to a display unit 310, wherein in step 440 image display parameters associated with a specified focus (i.e., the background reference in a first operating mode or the working tool in a second operating mode) and perimeter contours thereof are substantially maintained throughout at least part of the available trajectory of movement of the boom assembly 170. For example, as the boom assembly 170 is raised from an initial (i.e., lowest) position to an intermediate or otherwise higher position relative to the ground in the first operating mode, the portion of the terrain comprising the initial background reference would comprise a progressively smaller proportion of the overall field of view 332, 334 of the imaging device 304, whereas it is desired in such an embodiment to maintain a consistent display of the contours of the area of interest throughout such movement.

To facilitate such image processing, the method 400 may include receiving input signals from one or more kinematic sensors integrated within the imaging device 304 and/or otherwise on the frame 110, boom assembly 170, and the like, and/or input signals from other components such as for example a central vehicle control unit or user interface, for the purpose of determining the position of the boom assembly 170 and the corresponding position of the imaging device 304 as it travels along its available trajectory of movement (step 420). In an embodiment, models may be iteratively developed and trained over time so as for example to correlate respective identified positions of the boom assembly 170, etc., with respect to contours of one or more reference frames corresponding to the operating modes. If different areas of interest may be selectable or otherwise adjustable by users for a given embodiment, alternative or additional models may be trained to provide appropriate corresponding image processing factors for a given position of the imaging device 304 and/or boom assembly 170. Sufficiently trained models may then be retrievably selected for use based on a determined position in real time (e.g., in step 430) for dynamic image processing and compensation.

In an embodiment of the method 400 as represented in FIG. 4, the dynamic image compensation of the input data may comprise dynamic cropping and resizing of the raw input data from the field of view 332, 334 of the imaging device 304 and with respect to the area of interest. The image processing techniques may further include geometric and spatial translation of the input data via an appropriate model selected based on the determined current position of the imaging device 304. For example, mapping functions may be utilized to address varying orientations of the imaging device 304 and the corresponding field of view 332, 334 and the requisite projective transformations to maintain a common viewing plane for display to users.

One of skill in the art may appreciate that additional image processing techniques may be employed to address visual distortions in the raw image data. For example, for imaging devices 304 including ultra-wide-angle lenses the resultant image data may include barrel distortion effects dependent at least in part on the relative position of the area of interest within the overall field of view, such that the area of interest appears to be larger when it is central to the field of view and smaller when it is more peripheral with respect to the field of view.

Exemplary algorithms associated with one or more of the aforementioned image processing techniques may in certain embodiments be developed and improved over time for particular positions and orientations of the imaging device 304 as part of the model development and training process, wherein processing requirements and the potential for error may desirably be minimized for subsequent iterations of the method.

Based on the current operating mode and the image processing as previously described, output signals are generated to one or more display units, including for example an onboard display unit 310 in the operator cab 160, wherein each such display unit may be configured to visually represent the specified focus in substantially static form independent of the actual position of the boom assembly 170 relative to its available trajectory of movement, or at least the portion thereof corresponding to the respective operating mode.

In step 450 the method 400 may continue by, or upon, identifying a trigger for transitioning between the current operating mode and another operating mode.

In one example, a first operating mode or a second operating mode is automatically selected in accordance with a detected position of the second portion or some component thereof along its trajectory of movement. In the context of a blade at the end of a boom assembly, it is useful to monitor upward and downward movement of the blade relative to the ground being worked during a grading operation, but the relevant range of movement for such an operation may only be from the lowest position to about one to two feet above said lowest position. If the specified focus (i.e., static portion of the image) were to remain the background terrain but still include the blade as it raises along with the boom assembly for the remaining trajectory, this would force the viewing area to be quite large as the boom assembly may for example have a trajectory of movement of 11 feet. This would make the relevant portion of the viewing area much smaller than if the specified focus was limited to only the first one or two feet of movement, and accordingly in such an example the controller 302 may be programmed to identify a trigger (step 450) and transition from one operating mode to the other when the working tool 105 is observed to cross a corresponding threshold value, or an equivalent movement is detected with respect to another observed component.

As another example, in the context of a dump bucket as the working tool 105, it is useful to see if the bucket has cleared the edge of a bin which otherwise may be unavailable within the field of vision of an operator, and therefore the second operating mode is desired for at least a portion of the trajectory of movement for the boom assembly which corresponds to the most elevated positions.

Accordingly, an embodiment of a system and method as disclosed herein determines when the working tool is raised more than a threshold value (e.g., 2 feet) off the ground (step 450), at which point the operating mode is automatically transitioned to a second operating mode (step 470) and the working tool is maintained in static form within the displayed images as a specified focus while the background reference is moving along with continued movement of the boom assembly, up to a most elevated position wherein the bucket approaches and ultimately clears the bin edge. The system and method may further determine when the working tool has subsequently been lowered to within the threshold value from the ground (step 450), at which point the operating mode is automatically transitioned back to the first operating mode (step 460) and the background reference is now maintained in static form within the displayed images as a specified focus while the working tool (blade) moves within the images along with continued movement of the boom assembly.

In another example within the scope of the present disclosure, a transition from the first operating mode to the second operating mode is automatically performed in accordance with a position of the area of interest associated with the second position relative to maintained contours corresponding to the background. In the context of the blade as the working tool 105, during the first operating mode it may be desired as previously noted to focus the area of interest on the 1-2 feet of height above the ground, after which the working tool would no longer be within the displayed images if the background remains static. Accordingly, the controller 302 may be programmed to detect when a portion of the blade is no longer within the contours of the display (corresponding to the specified focus) and then transition to the second operating mode based thereon. In such an embodiment, if for example the operator is enabled to zoom in or out to define the scope of the specified focus, this may further define the threshold height at which the controller will identify a trigger for transition between operating modes, as the blade will enter or leave the specified focus area at different heights depending on how closely the images are magnified.

In another example within the scope of the present disclosure, automatic selection of the operating mode may otherwise be utilized but further disabled and/or superseded via manual input commands via a user interface.

Thus it is seen that an apparatus and/or methods according to the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments, unless otherwise specifically stated.

What is claimed is:

1. A method of visually representing an area of interest associated with a work vehicle,
   wherein the work vehicle comprises:
      a first portion comprising a frame supported by a plurality of ground engaging units and an operator cab;
      a second portion moveable relative to the first portion, wherein an area of interest associated with the second portion is obscured from view from within the operator cab during at least part of a trajectory of movement of the second portion; and an imaging device mounted on the second portion of the work vehicle to move relative to the frame and to the terrain along with the trajectory of movement of the second portion of the work vehicle and having a field of view including the area of interest throughout the at least part of the trajectory of movement of the second portion of the work vehicle;

the method comprising:

processing input data from the imaging device to generate output signals corresponding to a representative display of the area of interest to a display unit, based upon a selected operating mode;

wherein during a first operating mode, a background area and perimeter contours thereof within the field of view are substantially maintained in static form within displayed images while the area of interest associated with the second portion moves relative thereto;

wherein during a second operating mode, the area of interest associated with the second portion is, substantially maintained in static form within the displayed images while the background area within the field of view moves along with movement of the second portion; and wherein the first operating mode or the second operating mode is automatically selected in accordance with a detected position of the second portion along the trajectory of movement therefor.

2. The method of claim 1, wherein a transition from the first operating mode to the second operating mode is automatically performed in accordance with a position of the area of interest associated with the second position relative to maintained contours corresponding to the background area within the field of view.

3. The method of claim 1, wherein a transition between the first operating mode and the second operating mode is automatically performed based on the detected position of the second portion along the trajectory of movement compared with a threshold distance from a ground-engaging position for the area of interest associated with the second position.

4. The method of claim 1, wherein the automatic selection of the operating mode is disabled and/or superseded via manual input commands via a user interface.

5. The method of claim 1, wherein:

the second portion comprises a work implement supported by the frame and configured to selectively move a working tool at a distal end thereof between a ground-engaging position and a maximum elevated position at opposing ends of a trajectory of movement;

the area of interest comprises the working tool;

the first operating mode is active at least while the working tool is in the ground-engaging position; and the second operating mode is active at least while the working tool is in the maximum elevated position.

6. The method of claim 1, wherein the imaging device comprises a zoom lens, the method further comprising automatically adjusting a zoom setting based at least in part on a current position of the imaging device along the trajectory of movement of the second portion of the work vehicle.

7. The method of claim 1, wherein the imaging device is coupled to the second portion of the work vehicle via a rotatable mount, the method further comprising automatically adjusting rotation and accordingly an orientation of the imaging device based at least in part on a current position of the imaging device along the trajectory of movement of the second portion of the work vehicle.

8. The method of claim 1, comprising dynamically processing the input data based on a current position of the imaging device along the trajectory of movement of the second portion of the work vehicle.

9. The method of claim 8, wherein the dynamic processing of the input data comprises dynamic cropping and resizing of the input data from the field of view of the imaging device and with respect to an area of interest comprising a specified focus.

10. The method of claim 9, the method further comprising determining the current position of the imaging device in a local reference system via at least signals from one or more kinematic sensors.

11. The method of claim 9, further comprising generating and iteratively training and updating a plurality of models corresponding to respective positions of the imaging device throughout the trajectory, wherein the dynamic processing of the input data comprising dynamic cropping and further geometric and spatial translation of the input data is performed via selection of an appropriate model based on the determined current position of the imaging device.

12. A work vehicle comprising:

a first portion comprising a frame supported by a plurality of ground engaging units and an operator cab;

a second portion moveable relative to the first portion, wherein an area of interest associated with the second portion is obscured from view from within the operator cab during at least part of a trajectory of movement of the second portion;

an imaging device mounted on the second portion of the work vehicle to move relative to the frame and to the terrain along with the trajectory of movement of the second portion of the work vehicle and having a field of view including the area of interest throughout the at least part of the trajectory of movement of the second portion of the work vehicle;

a display unit; and a controller functionally linked to the imaging device to receive input data therefrom, and further configured to:

process input data from the imaging device to generate output signals corresponding to a representative display of the area of interest to the onboard display unit, based upon a selected operating mode;

wherein during a first operating mode, a background area and perimeter contours thereof within the field of view are substantially maintained in static form within displayed images while the area of interest associated with the second portion moves relative thereto;

wherein during a second operating mode, the area of interest associated with the second portion is substantially maintained in static form within the displayed images while the background area within the field of view moves along with movement of the second portion; and wherein the first operating mode or the second operating mode is automatically selected in accordance with a detected position of the second portion along the trajectory of movement therefor.

13. The work vehicle of claim 12, wherein a transition from the first operating mode to the second operating mode is automatically performed in accordance with a position of the area of interest associated with the second position relative to maintained contours corresponding to the the background area within the field of view.

14. The work vehicle of claim 12, wherein a transition between the first operating mode and the second operating mode is automatically performed based on the detected position of the second portion along the trajectory of movement compared with a threshold distance from a ground-engaging position for the area of interest associated with the second position.

15. The work vehicle of claim 12, further comprising a user interface configured to receive manual input commands, wherein the automatic selection of the operating mode is disabled and/or superseded via the manual input commands.

16. The work vehicle of claim 12, comprising:
a work implement supported by the frame and configured to selectively move a working tool at a distal end thereof between a ground-engaging position and a maximum elevated position at opposing ends of a trajectory of movement;
the area of interest comprises the working tool;
the first operating mode is active at least while the working tool is in the ground-engaging position; and
the second operating mode is active at least while the working tool is in the maximum elevated position.

17. The work vehicle of claim 16, wherein the second portion comprises the work implement.

18. The work vehicle of claim 16, wherein the work implement comprises a boom as the second portion supported by the frame and having the imaging device mounted thereon, an arm as a third portion moveable independently of the second portion, and a working tool as a fourth portion moveable independently of the third portion.

* * * * *